United States Patent
Brown et al.

(10) Patent No.: US 7,110,514 B2
(45) Date of Patent: Sep. 19, 2006

(54) IDENTIFYING A CONTEXT FOR A CALL

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 10/022,160

(22) Filed: Dec. 17, 2001

(65) Prior Publication Data

US 2003/0112941 A1    Jun. 19, 2003

(51) Int. Cl.
*H04M 3/42* (2006.01)
(52) U.S. Cl. .................... 379/201.01; 715/708
(58) Field of Classification Search ........... 379/201.01, 379/201.02, 201.04, 201.05, 201.06, 201.07, 379/201.08, 207.01, 207.15, 215.01; 715/708
See application file for complete search history.

(56) References Cited

U.S. PATENT DOCUMENTS

| | | | |
|---|---|---|---|
| 5,499,288 A | 3/1996 | Hunt ......................... 379/88 |
| 5,673,404 A | 9/1997 | Cousins ..................... 395/347 |
| 5,757,904 A * | 5/1998 | Anderson ............... 379/265.06 |
| 5,761,288 A * | 6/1998 | Pinard et al. .......... 379/201.03 |
| 5,774,534 A * | 6/1998 | Mayer ................... 379/142.01 |
| 5,790,637 A | 8/1998 | Johnson ...................... 379/67 |
| 5,915,001 A | 6/1999 | Uppaluru ................. 379/88.22 |
| 5,940,476 A | 8/1999 | Morganstein ............ 379/88.02 |
| 5,946,654 A | 8/1999 | Newman .................... 704/246 |
| 6,038,305 A | 3/2000 | McAllister ................. 379/207 |
| 6,058,364 A | 5/2000 | Goldberg ................... 704/252 |
| 6,101,242 A | 8/2000 | McAllister ............... 379/88.02 |
| 6,393,112 B1 * | 5/2002 | Gottlieb et al. ......... 379/112.01 |
| 6,760,426 B1 * | 7/2004 | Sbisa et al. ............ 379/221.09 |
| 6,842,512 B1 * | 1/2005 | Pedersen ................ 379/142.01 |
| 2002/0118807 A1 | 8/2002 | Pedersen |

FOREIGN PATENT DOCUMENTS

| | | |
|---|---|---|
| EP | 0585004 A2 | 3/1994 |
| EP | 0676882 A2 | 10/1995 |
| JP | 8139797 A | 5/1996 |
| JP | 10294784 A | 11/1998 |

OTHER PUBLICATIONS

WPAT Derwent 1994-067503.
WPAT Derwent 1995-346415.
WPAT Derwent 1996-315499.
WPAT Derwent 1999-031530.

* cited by examiner

*Primary Examiner*—Harry S. Hong
(74) *Attorney, Agent, or Firm*—H. Artoush Ohanian; Mark S. Walker; Biggers & Ohanian, LLP

(57) ABSTRACT

A method, system, and program for identifying a context for a call are provided. Multiple context clues for a call are detected from a line number, a line subscriber profile, a caller profile, and other parameters associated with the call. A context for the call is identified from the context clues, such that at least one party to the call is enabled to receive the context of the call. Context for the call preferably includes at least one of who is placing a call, who is receiving a call, identities of devices utilized for the call, locations of those devices, the path of line number numbers accessed for a call, a billing plan for the call, and a subject matter of the call.

79 Claims, 8 Drawing Sheets

IDENTIFYING A CONTEXT FOR A CALL

BACKGROUND OF THE INVENTION

1. Technical Field

The present invention relates in general to telecommunications and, in particular, to voice identification. Still more particularly, the present invention relates to identifying a context of a call.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Today, the public switching telephone network (PSTN), wireless networks, and private networks telephone services are based on the identification of the wireless telephone or wireline that a calling party uses. A service, often referred to as A caller ID@ provides the party receiving a call with the line number and name of the subscriber of the line number.

One limitation of caller ID is that the identity of the party actually making the call is not received, just the name of the line subscriber. For example, in a private network, if AJoe Smith@ is making a call from ATom Arnold's office line@ only the extension for ATom Arnold's office line@ and an identifier for ATom Arnold@ are transferred to the called party.

Another limitation of caller ID is that the identity of the party answering the call is not returned to the party making the call. For example, in a PSTN, a single line number may be answered by multiple parties, and at multiple telephone devices, where the caller ID does not identity the party answering the call.

A further limitation of caller ID is that a line number and line subscriber name provide a limited context for a call. For example, in a wireless network, where ATom Jenkins@ calls a friend's wireless number, ATom Jenkins@ does not receive any information about whether the call is wireless, how the call is being billed, and whether the wireless number is a business or personal number.

Therefore, in view of the foregoing, it would be advantageous to provide a method, system, and program for providing the context of a call, including the actual identities of parties making and receiving calls, the devices at which calls are originated and received, and the owners of the devices at which calls are originated and received. In addition, it would be advantageous to provide additional context information indicating the location of a device originating or receiving a call, where location information may include the time zone, state, country or other locale related specifics.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for identifying a context of a call.

According to one aspect of the present invention, multiple context clues for a call are detected from a line number, a subscriber profile, a caller/callee profile, and other parameters associated with the call. A context for the call is identified from the context clues, such that at least one party to the call is enabled to receive the context of the call. Context for the call preferably includes at least one of who is placing a call, who is receiving a call, identities of devices utilized for the call, locations of those devices, a billing plan for the call, the path of line number numbers accessed for a call, and a subject matter of the call.

A trusted telephone network preferably processes the call and initiates a context inference service to identify the context of a call. The context inference service may be initiated locally within the trusted telephone network or at a server located outside the trusted telephone network, with additional security applied for the communication channel.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
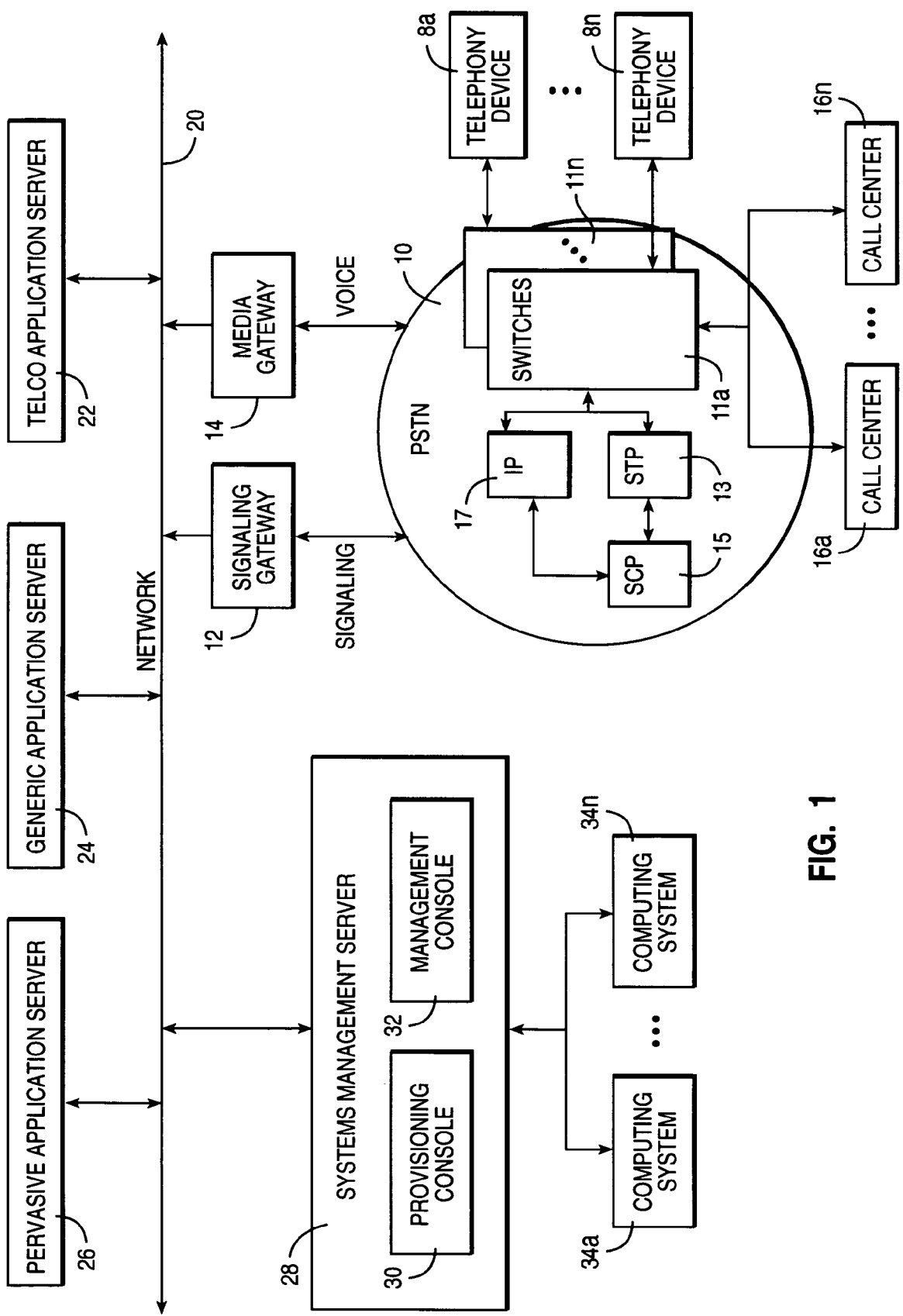
FIG. 1 depicts a block diagram of a network environment in which the present invention may be implemented.

A method, system, and program for identifying a context for a caller making a call and a callee receiving the call are provided. For purposes of the present invention, context may include, but is not limited to, the identity of the caller or callee, the device identity and owner, the location of the caller and callee, the path of a call, and billing information for the caller and callee. Location of the caller and callee may include, but is not limited to, the time zone, country, state, city, building location, or GPS location of a caller or callee. The path of a call may indicate, for example, that a call is forwarded, transferred, split, added to a conferencing session, or other call service options utilized.

The present invention is preferably performed by a context inference engine located within an Intelligent Peripheral of the trusted telephone network and/or located within a Telco Application service outside the trusted telephone network. As will be further described, the Telco application service located outside the trusted telephone network is enabled to provide services to callers and callees via enhanced security channels.

The identity of the caller and callee are preferably authenticated. In particular, identity authentication is preferably performed by authenticating the voices of the caller and callee, however other biometric input may also be utilized for identification. Identity authentication may be initiated by the origin device originating the call, the intermediary device processing the call, or the destination device receiving the call. Each of the devices may also access a third party or external server to perform the identity authentication. Performance of identity authentication has different advantages depending on the device initiating the identity authentication.

While in the present invention, authentication of a caller or callee identity is described with emphasis placed on voice authentication, other methods of caller and callee identity authentication may also be performed. Voice samples utilized for voice authentication are just one of multiple types of biometric sampling. For example, a caller or callee may locally provide an eye scan, a fingerprint, and other biophysical identifiers that are transmitted within or outside the trusted network to authenticate the identity of the caller or callee. Alternatively, keypad entries, such as a pin code, account number, password, or other secure transaction key may be entered by a caller or callee and utilized to authenticate the identity of the caller or callee.

Other context information is received, determined and inferred from context clues. Context clues may include the identities of the caller and callee, the line numbers, the line subscriber profiles, caller/callee profiles, each central office receiving the call, and other parameters associated with the call. As a call is transferred and forwarded, context clues for each portion of a call path are gathered and utilized to update the context of the call.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themselves to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11a–11n and telco application server 22 via signaling gateway 12. In addition, a voice channel is opened between central office switches 11a–11n and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11a–11n, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDS may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11a–11n to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11a–11n if the additional caller input is verifiable for the VID.

An origin telephony device or destination telephony device may also determine a VID and/or RVID for the caller and/or callee of a call. In particular, telephony devices 8a–8n and call centers 16a–16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n.

The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, authentication of the identity of the caller is preferably initiated in IP 17 or telco application server 22. Once a VID for a caller is received at a central office switch, a context inference application is initiated in IP 17 or telco application server 22. The context inference engine preferably requests a caller profile according to VID to determine billing information and personal information about the caller. In addition, the context inference engine preferably determines the identity of the device utilized by accessing a device directory, prompting the caller to indicate the device identity, or other methods. Further, the location of the device may be inferred from information provided by the central office switch originating the call, a GPS location, and the location assigned to a line number. The context information is preferably loaded with the VID at the central office switch.

The context information may be filtered at the central office switch according to general filtering preferences indicated by a caller in the caller profile. In addition, context information may be filtered according to caller filtering preferences specifically selected for the callee. Context information is then transferred with the call routed by one or more central office switches to a destination central office switch that services the called party's station or line.

Then, in the present invention, the context information is forwarded with a caller VID to the callee device. The callee is enabled to determine whether to answer a call, transfer the call to voice mail, or select from other call handling options, based on knowing the identity of the caller and the context of the call.

In addition, authentication of the identity of a callee answering the call is preferably initiated in IP 17 or telco application server 22. Once a RVID for a callee is received at a central office switch, a context inference application is initiated in IP 17 or telco application server 22 to determine the context of the callee side of a call. The callee context information is preferably filtered according to callee preferences and transferred to the caller, such that the caller is enabled to determine whether the callee is the intended recipient.

As a call is forwarded or transferred to other callers and callees, IP 17 or telco application server 22 are preferably initiated to update the context for a call. For example, the context may indicate the path of line number accessed in a call and whether the call was transferred or forwarded.

Figure 2:
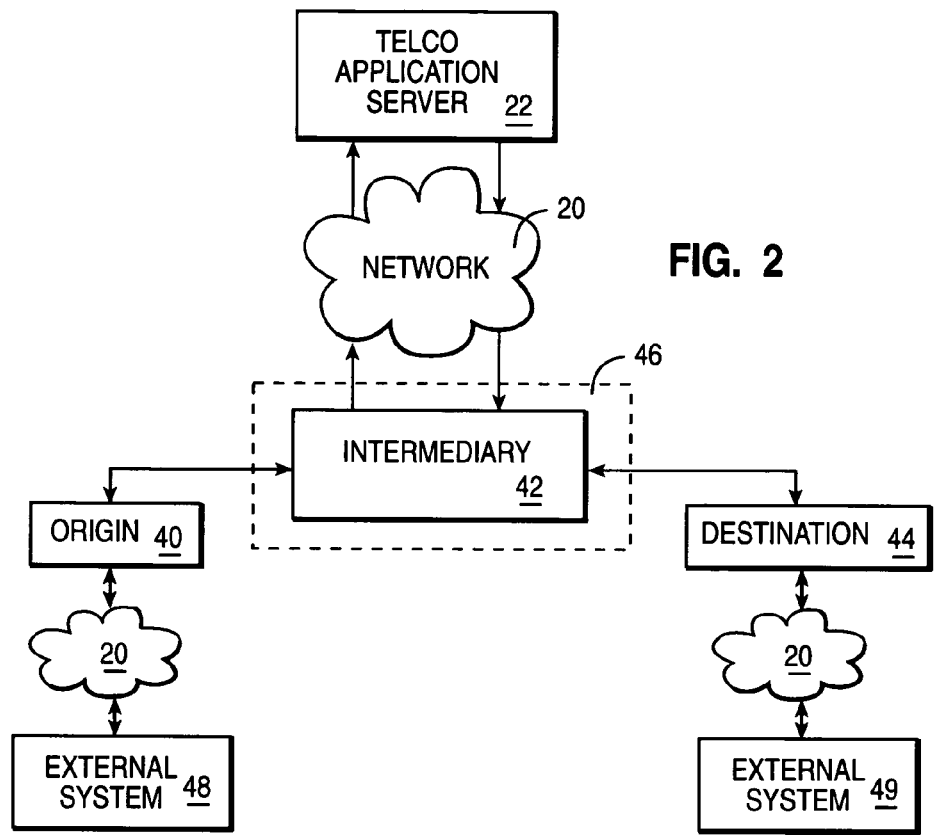
FIG. 2 illustrates a block diagram of an identity authentication and context inference system in accordance with the method, system, and program of the present invention.

Referring now to FIG. 2, there is illustrated a block diagram of an identity authentication and context inference system in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, to authenticate the identity of the caller. If there is a match between the voice utterance and a voice template, then a VID is determined for the caller and utilized to authenticate the caller identity for retrieving a caller profile and billing the caller. However, in alternate embodiments, the identity of a caller may be authenticated according to passwords, eye scans, encryption, and other biometric methods.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Similarly, a destination device 44 is utilized by a callee to receive a call. Advantageously, an authenticated identity of the callee may be determined as an RVID. Callee identity authentication may be initiated by origin device 40, intermediary device 42, or destination device 44, in a manner similar to initiation of caller identity authentication, as described above.

In addition to authenticating the identity of a caller or callee in a VID or RVID, the context of the call is preferably determined and transmitted as part of the VID or RVID or separate therefrom. Origin device 40, intermediary device 42, telco application server 22, and/or destination device 44 may include context inference engines that perform context inference services. A context inference engine may utilize context information gathered from multiple databases and may gathered context information directly from a caller or callee in response to prompts.

Context may include, but is not limited to, a subject matter of a call, a device identity, the location of an origin or destination device, billing information, service subscriptions, the path of a call, and other information which may provide a caller or callee with context of a call. Information for determining the context of a call may be gathered from multiple accessible information including, but not limited to, a caller or callee profile, from routing information utilized by intermediary 42 from a device directory, from selections by a caller or callee at systems management server 28, or other databases of information. The context inference engine may, for example, infer the subject matter of a call as either business or personal based on the identity of the device from which a call originates and the location of that device. Alternatively, the subject of a call as either a business subject or personal subject may be inferred from the billing information context.

A VID or RVID may be transferred in multiple protocols, including, but not limited to, Interface Definition Language (IDL). A VID or RVID may include a range of information, where each type of information may be tagged or identified in some other manner. For example, the following tagged VID may be transmitted to represent an authenticated identity of a caller and context of the call:

[name] Jon Smith
[device] Jane Doe's cell phone
[location] Central Time zone, Austin, Tex.
[subject] Project A, business
[billing] Jon Smith's business service provider C
[authenticated by] Jane Doe's cell phone, service provider G In another example, the following tagged RVID may be transmitted to the caller to represent an authenticated identity of a callee and the context of the call, including the path of the call:

[name] Albert Jones
[device] Albert Jones' home phone
[location] Dallas, Tex.
[path] call forwarded from 101-304-0000 to 214-333-1111

Figure 3:
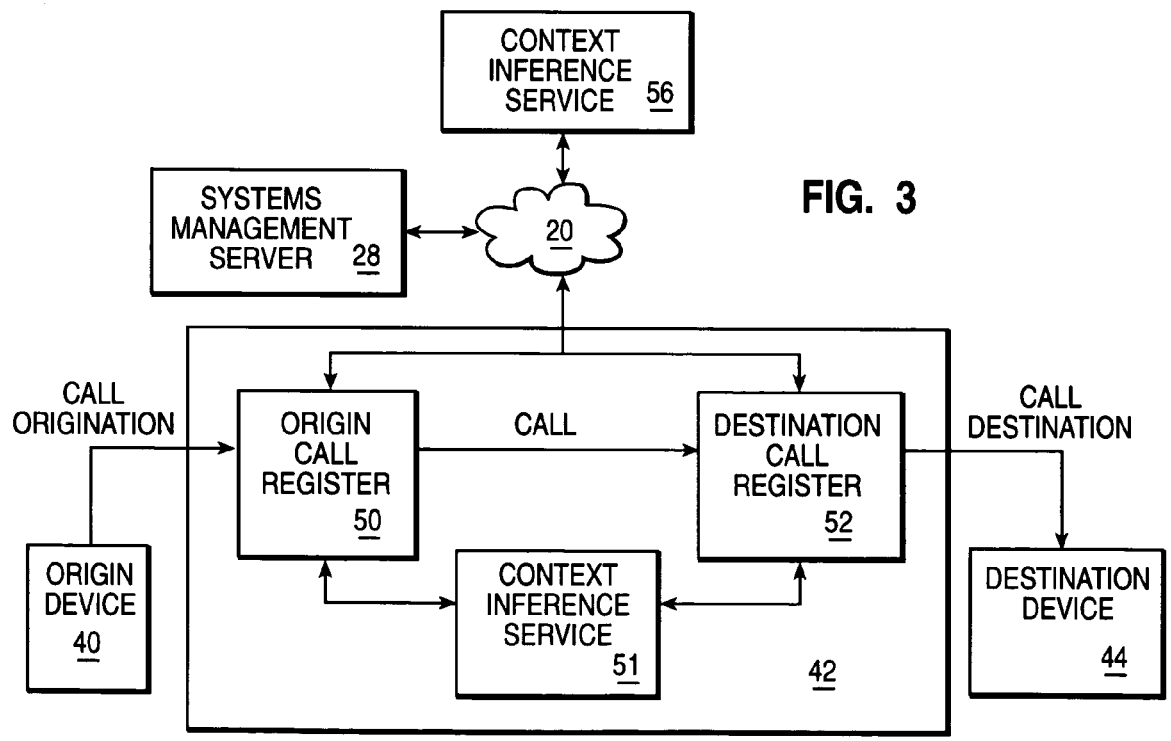
FIG. 3 depicts a block diagram of the flow of a call through a context inference system in accordance with the method, system, and program of the present invention.

With reference now to FIG. 3, there is depicted a block diagram of the flow of a call through a context inference system in accordance with the method, system, and program of the present invention. As illustrated, origin device 40 transfers a call request to intermediary device 42. The call request may be an off-hook condition for a wireline device or a network service connection request for a wireless device.

Preferably, a switching service receiving the call request establishes an origin call register 50 and retrieves a line subscriber profile for the origin device line number. The line subscriber profile may be accessed from an SCP or a data storage system external to trusted telephone network 46.

Next, a context inference service may be initiated by the origin switching service. In particular, a context inference service 51 may be located within trusted telephone network 46 as an IP. Alternatively, a context inference service 51 may be located outside trusted telephone network 46 within a telco application server accessible via network 20.

The context inference service preferably determines context for a call including, but not limited to, who is calling, the device utilized to place the call, the location of the caller, the billing method for the call, the path of the call, and/or the subject matter of the call. In addition, the context inference service preferably determines context for a call including, but not limited to, who receives a call, the device utilized to receive the call, the location of the callee, and the subject matter available for discussion by the callee. In addition, other categories of context may be determined.

To determine the identity of the device utilized to place a call, the entity subscribing to the line number and/or an identifier for the device are preferably accessed. The first set of context clues is provided to the context inference service by the line subscriber profile. In particular, a line subscriber profile indicates the individual or business that subscribes to a particular line number. Further, a line subscriber profile may indicate that a business subscribes to a telephone service, but provide that service is subscribed to for use by a particular employee or group of employees. Alternatively, the line subscriber profile may indicate that the line is a personal line.

Preferably the identity of the device may be inferred from the line subscriber profile and other information available. A device identity may include a device name, a line number utilized to access the device, and the device type. The device name may be assigned by the line subscriber and output with a signal from the device. Alternatively, the line subscriber profile may indicate the device name. The device type may indicate the type of line utilized to access the device, including, but not limited to, wireline, wireless, or multiplexed. In addition, the device type may indicate the type of device accessed by the line including, but not limited to, a car telephone line, a computer modem line, a PBX land line, a residential line, a business line, or an Asymmetric Digital Subscriber Line (ADSL) multiplexed line.

In addition, the line subscriber profile indicates the billing information and services subscribed to by the line subscriber. Billing information may provide context for whether the line number is a business line or personal line. In addition, a billing context for a call may indicate the party responsible for charges incurred in the call.

Further, a line subscriber profile preferably indicates whether the line number is subscribed to for a wireline device, a wireless device, or both. Additional context information may be inferred from whether a wireline or wireless device is utilized.

Further, determining or inferring the location of a device is advantageous context information. For a wireless device, the location of a device may be determined most precisely where a GPS tracking system is utilized by the origin device 40 or intermediary device 42, to determine the exact geographical location of a caller. For a wireline device, the location of the device is fixed according to the location the service is registered for the number.

In addition, for both a wireline and wireless device, a general location of the originated call may be determined from the geographical area covered by the switching center receiving the call. Wireless devices are preferably provided service by a particular tower or other signal distribution point. The geographical location and area covered by that tower may provide a general location of the origin of a call. As the origin device moves from one wireless coverage area to another, the location may be updated.

The context inference service may infer additional context from location information. For example, the time zone of the caller, the direction of movement of the caller, and other location related information may be inferred from location information.

In addition to extending a dial tone to a caller, an identity of the caller is preferably authenticated and loaded into origin call register 50. A caller profile accessed according to the VID is then accessed and loaded into origin call register 50. The context inference service preferably utilizes the caller profile and VID as additional context clues for the call.

In particular, in retrieving a caller profile according to VID, systems management server 28 may be accessed. Systems management server 28 preferably provides an interface through which an individual may adjust preferences, select services, and provide other information, which is stored and made accessible according to the individual's VID. Systems management server 28 may track services that an individual subscribes to, such as a stock subscription service. In addition, systems management server 28 allows an individual to adjust billing information and view current charges according to VID.

The VID provides the context of who is placing the call. The caller profile provides further context based on the billing information and service subscriptions of the caller. In addition to indicating who is answering the call, the role of the person answering the call may be indicated.

In addition, a caller profile may include preferences for filtering context information depending on multiple factors. Such factors may include, but are not limited to, the callee, the device placing the call, the device receiving the call, the time of day, a caller's schedule, and other variables selected by the caller.

The subject matter of a call may be determined by prompting a caller to provide a voice or text entry indicating the subject matter of the call. Alternatively, the context inference engine may infer the subject matter of a call based on the caller's schedule. The context inference engine may also infer the subject matter of a call based on the caller's business or the business associated with the line number utilized by the caller.

According to an advantage of the present invention, where a business subject is determined as the context for a call, then business qualification information about the caller or the callee may be accessed from the caller or callee profile and output with the context. In particular, a business bureau database may be accessed to retrieve business qualification information. Business qualification information might include, for example, licenses, certificates, awards, commendations, resume experience, and other indicators of a party's qualifications in a business area.

The call is preferably transferred through a voice channel to a destination switch, in which a destination call register 52 is created to hold the call. In addition, context for the call may be transferred through a signaling channel to the destination switch and loaded into destination call register 52.

Advantageously, the destination switch controls termination of the call at destination device 44. The context information for the call is also transferred to destination device 44, such that the callee is provided with a context for the call. The context information available in destination call register 52 may be filtered prior to transmittal to destination device 44 according to filtering preferences associated with the device, a line subscriber, or the callee. In addition, destination device 44 may filter the context displayed to a callee according to the device capabilities and preferences selected for the device.

In particular, the destination switch preference initiates at least one of context inference service 51 and context inference service 56 to determine the context of the recipient side of a call. Determining the context of the recipient side of a call may be performed in a manner similar to that described with reference to determining the context of the caller side of a call. In addition, as will be further described, context inferences may be further enhanced when caller side and recipient side context information is combined.

The line subscriber profile associated with destination device 44 may be accessed and utilized by the context inference service to determine context for the call. In addition, destination device 44 may return a device identifier to destination call register 52 or the identity of destination device 44 may be inferred from other context information. Further, the identity of the callee is preferably authenticated, such that the RVID and callee profile accessible according to RVID further enhance context information.

Context information determined for the recipient side of the call may be transferred to origin device 40 via origin call register 50. Filtering of the recipient call context may be performed according to multiple factors, including callee filtering preferences. In particular, multiple entities may receive the filtered context information, where filtering preferences may be uniquely specified for each of the multiple entities.

Additional context inferences may be inferred when caller side and recipient side context information is viewed concurrently. For example, where the caller is a subscriber to a stock service and the callee is the stock service, the subject matter of the call may be inferred to include access to the stock service. In another example, where the caller and the callee share the same last name, it may be inferred that there is a relation between the parties. In yet another example, where the caller and the callee share an address or other information, it may be inferred that the parties work at the same business address or live at the same personal address.

In addition, context may indicate the path of a call. Each line number accessed during a call is preferably captured by a switch, such as the origin switch or destination switch. In addition, where origin device 40 or destination device 44 are call centers or private switching networks, the path of the call through the call centers or private switching networks may be captured. Where a single call is transferred or forwarded to a series of people, the VIDs and RVIDs of each person or automated service answering a device are preferably included in the path of a call. Further, even where the RVID of a callee is blocked or context is blocked, the path of the call may still indicate that the call was forwarded or transferred.

Further, as previously described, origin device 40 and destination device 44 may represent server systems, private switching systems, and other systems that enabled a caller or callee to utilize an individual telephone device. Where an individual telephone device is directly dialing another individual telephone device, context may indicate that a Aperson-to-person@ call is placed. Where an individual telephone device accesses a private switching network that routes the call to an individual telephone device, context may indicate that a Aperson-to-business-to-person@ call is placed. Further, where an individual telephone device dials into a server that then accesses an individual device, context may indicate that a Aserver-enabled@ call is placed. Further, where an individual telephone device accesses another individual telephone device that manages calls for another individual telephone device, context may indicate that a Aperson-to-on behalf of person@ call is placed. Further, where a call is automatically forwarded from a dialed line number to another line number, context may indicate that a Aperson-to forwarded line@ call is placed. It will be understood that context labels utilized herein are merely illustrative examples of types of labels that may identify the context of the devices required to complete a call.

Figure 4:
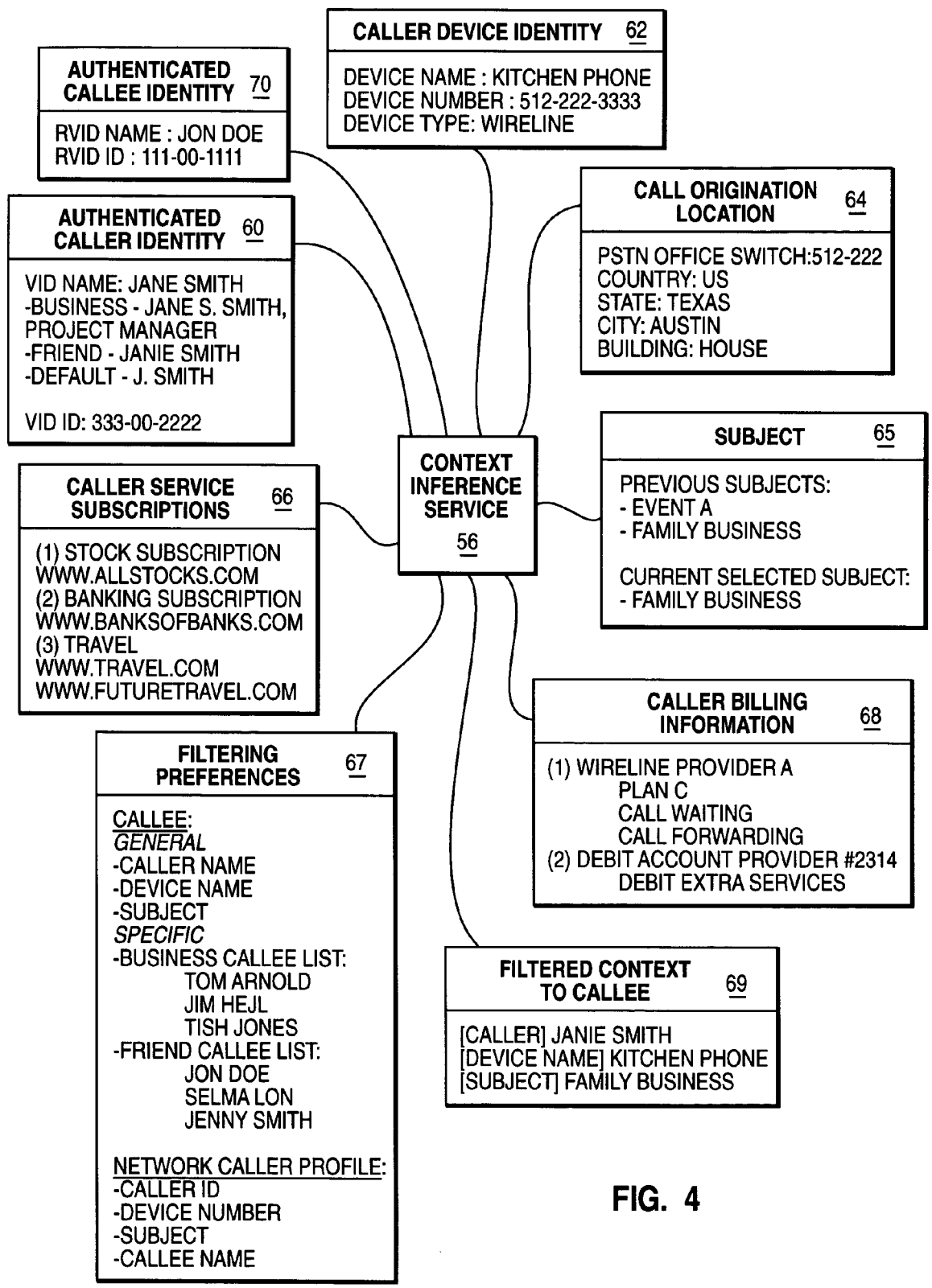
FIG. 4 illustrates a block diagram of context information associated with a caller in accordance with the method, system, and program of the present invention.

Referring now to FIG. 4, there is depicted an illustrative example of context information associated with a caller in accordance with the method, system, and program of the present invention. As illustrated, multiple types of context information may be accessed and determined by context inference service 56. In addition to the examples depicted, in alternate embodiments, other types of context information may be accessed and determined.

In the example, a call is placed by AJane Smith@ to AJon Doe@. For purposes of illustration, context inference service 56 is determining the context for a call from the perspective of the caller, with reference to the identity of the callee. However, call context may also be determined from the caller and callee perspectives concurrently or independently.

First, authenticated caller identity context 60 is retrieved to indicate who is calling. Advantageously, the name and identifier of a caller may be determined by authenticating the voice of the caller or utilizing other caller identification. An authenticated identity may also indicate, for example, the device utilized to perform the authentication, the frequency of identity of authentication, and the number to tries to achieve identity authentication.

According to one advantage of the present invention, a caller may provide multiple variations of a name categorized according to the type of callee receiving the VID. For example, a business associate may receive the caller's full name and job title. A friend may receive the caller's nickname. As will be further described, the VID name is preferably filtered for output to a callee according to caller preferences and the callee identity.

Next, caller device identity context 62 is determined to indicate the device utilized to place the call. An origin device may provide device identification or the context inference service may detect and/or infer the device identity. In the example, device identity context includes the name of the device, the line number associated with the device and the type of device. The name of a device may include a specific phone within a business or home or may indicate the line subscriber of the line number. In addition, the name of the device may include a server system or private switching network identifier enabling the origin device. The device type may indicate whether a wireless or wireline connection is utilized by the device. Further, the type of device may further specify the type of device associated with the connection, such as a home phone line, a PBX land line, and a wireless car phone.

A call origination location context 64 is also determined to indicate the geographical location of the origination of a call and provide information for determining a device identity. A GPS location of an origin device may be transmitted with the call or detected by an intermediary device. In addition, the context inference service may determine a general location of an origin device based on the geographical area serviced by a PSTN switching network or wireless service provider service area. In the example, the PSTN switching network office switch receiving the call is identified by the numbers serviced by that office switch. The context inference service may then lookup the office switch geographical area, which in the present example includes country, state, and city identifiers. Further, in the example, the context inference server may lookup the line number to determine the type of building assigned to the line number, here Aresidential@.

Further, caller service subscriptions context 66 is depicted to indicate the services selected by a caller. A caller may subscribe to services accessible via telephone that are accessible according to the caller VID. In the example, caller service subscriptions include a stock subscription, a banking subscription, and travel subscriptions. Such subscriptions may charge the caller per access or may authorize the service to call the caller when criteria indicated by the caller occur. Indicating caller service subscriptions enhances context when a caller makes a call to a service already subscribed to or to a service not yet subscribed to.

In addition, caller billing information context 68 is provided to indicate the billing selections of a caller. Each caller may select multiple service providers and billing options that are accessible according to the caller VID. In the example, a caller has selected a wireline provider A and a debit account provider. Wireline provider A preferably services the current call. Extra services requested by the caller are preferably charged to the caller's debit account. The context inference engine may filter billing information to indicate a portion of a call the caller will pay for, service available for the call, and whether the caller will pay for additional services.

A subject context 65 indicates previous subjects of calls by the caller from the device. The caller may be prompted to select from one of these previous subjects, stored according to VID in the caller profile. In this example, the caller has selected the subject of the call as Afamily business@. A caller may further select a level of urgency of the call, specify the type of family business, or other further specifications of the subject matter of a call. In addition to storing previous subjects according to caller and device, previous subjects may be stored according to the caller/callee combination, and retrieved when the caller/callee combination is detected. Moreover, a caller may be enabled to search through the database of previous subjects, organized according to caller, device, callee, time, location, and other criteria. A caller may also have a list of Afavorite subject matters from which quick subject matter selections may be made.

Filtering preferences context 67 are preferably accessed from a caller profile. In the example, filtering preferences are first divided according to the place a VID is transferred. The VID may be transferred to a callee, to a network location for storage according to VID in a caller profile, to an incoming caller and to a data mining service or other vendors allowed access to VIDs and RVIDs of current calls. Preferably, a caller is allowed to set filtering preferences for the portions of the total context that are transferred to each entity. In particular, while not depicted, a caller may specify preferences for filtering context information for display to a call incoming while another call is already in progress. For example, such preferences may filter which incoming callers are allowed to view the identities of the parties to the current call and other context thereof.

Further, the caller may further specify the callee category according to the actual callee. Here, in general, the caller elects for only the name, device name, and subject of the call to be transferred to callees. However, the caller further specifies a first group of RVIDs that are to receive the business name for the caller and a second group of RVIDs that are to receive the friend name for the caller. Others, receive the caller's default name.

As an example, filtered call context to the callee 69 includes the tagged VID for transfer to the callee, including context information. Here, the callee RVID is included in the friend group, so the friend name is output. In particular, an authenticated callee identity context 70 determined for the call indicates the RVID of the callee, which is included in the friend list. In addition, the device name and subject matter are output. A filtered call context to a network caller profile storage server might only include a VID ID, device ID and subject matter.

Figure 5:
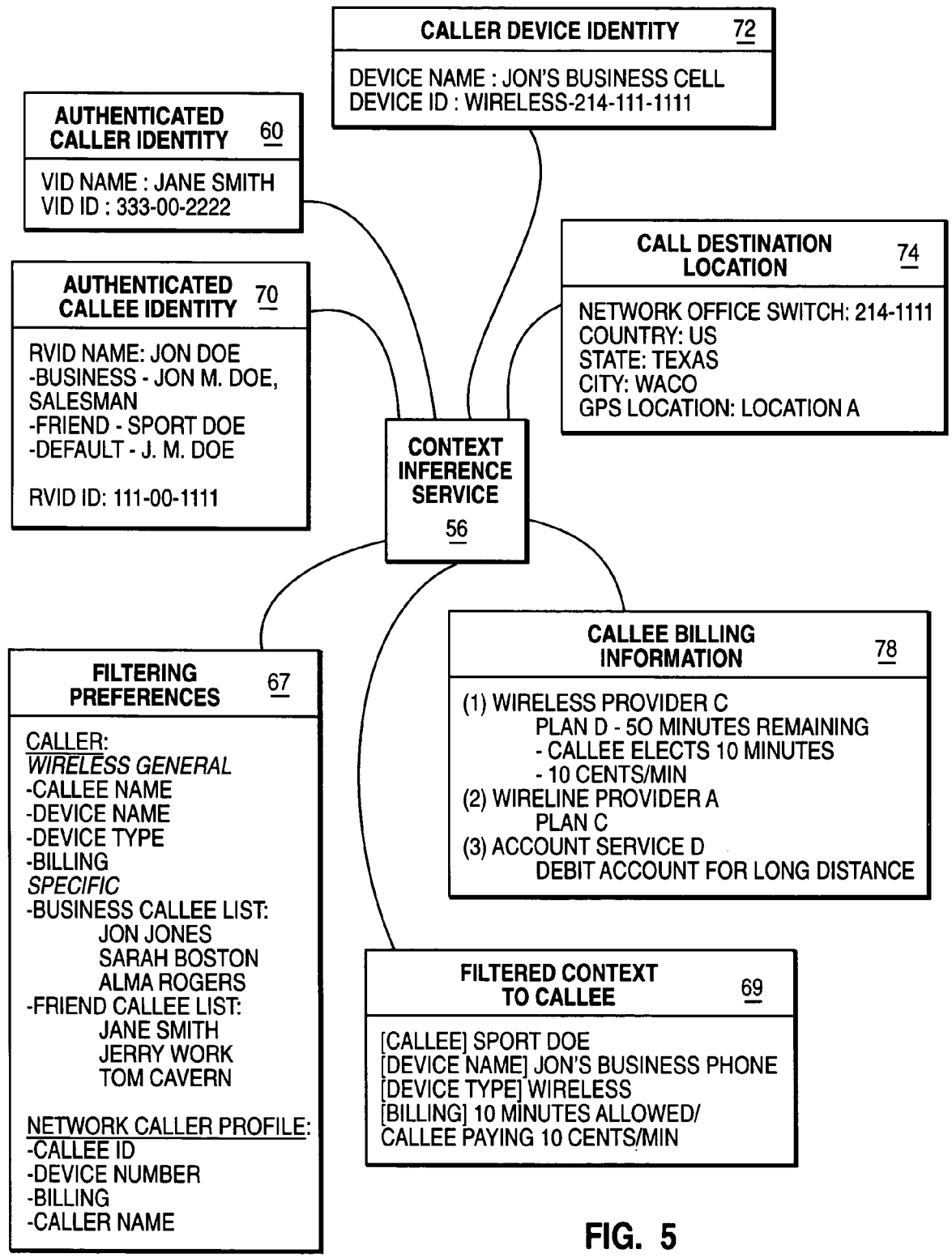
FIG. 5 depicts a block diagram of context information associated with a callee in accordance with the method, system, and program of the present invention.

With reference now to FIG. 5, there is illustrated an illustrative example of context information associated with a callee in accordance with the method, system, and program of the present invention. As illustrated, multiple types of context information may be accessed and determined by context inference service 56. In addition to the examples depicted, in alternate embodiments, other types of context information may be accessed and determined.

In the example, the call is still placed by AJane Smith@ to AJon Doe@. However, for purposes of illustration, context inference service 56 is determining the context for a call from the perspective of the callee, with reference to the identity of the caller.

First, authenticated callee identity context 70 is provided indicate who is receiving a call. Advantageously, the name and identifier of a callee may be determined by authenticating the voice of the callee or utilizing other callee identification. An authenticated identity may also indicate, for example, the device utilized to perform the authentication, the frequency of identity of authentication, and the number to tries to achieve identity authentication. Further, the RVID name may include multiple variations, selectable according to the relationship of the caller to the callee. For example, for a business relationship, the business name and position are selected. For a friendship, the nickname is selected.

Next, callee device identity context 72 is provided to indicate the device utilized to receive the call. A destination device may provide device identification or the context inference service may detect and/or infer the device identity. In the example, device identity context includes the name of the device, the line number associated with the device and the type of device. Here, the name of the device is AJon's Business Phone@, as inferred by the context inference service from the line subscriber profile for the device. The device is a wireless device.

A call origination location context 74 is also provided to indicate the geographical location of the origination of a call. A GPS location of an origin device may be transmitted with the call or detected by an intermediary device. In addition, the context inference service may determine a general location of an origin device based on the geographical area serviced by a PSTN switching network or wireless service provider service area. In the example, the PSTN switching network office switch receiving the call is identified by the numbers serviced by that office switch. The context inference service may then lookup the office switch geographical area, which in the present example includes country, state, and city identifiers. Further, in the example, the context inference server may lookup the line number to determine the type of building, here Alocation A@.

In addition, callee billing information context 78 is provided to indicate the billing selections of a callee. In addition, billing context may indicate the number of minutes a callee has available for the call or the amount the callee is paying per minute. By providing the caller with context for the cost of the call to the callee, the caller may, for example, offer to pay for a portion of the cost, may limit the talk time, or may access the callee through another, less expensive communication medium. In addition, the callee may select a time limit for the call, that is extendable by the caller paying for the extra time. Here, the callee has designated ten minutes available for billing from the callee end for the call.

Filtering preferences context 76 is preferably accessed according to the RVID from a callee profile. As described with reference to filtering preferences context 67, preferences may be selected in general and more specifically according to the VID of the caller. Here, a caller has selected in general, when the device utilized is a wireless device, to provide the caller with the callee name, device name, type of device, and billing information for the call.

Filtered context to caller 77 provides an example of a tagged VID for transfer to the caller. In the example, since the caller VID is included in a friend list, the friendship VID name is utilized. In addition, since the callee is utilizing a wireless device, the device name, device type, and billing information for the call are output. Advantageously, the billing information indicates the number of minutes allowed for the call and the cost per minute.

Figure 6A:
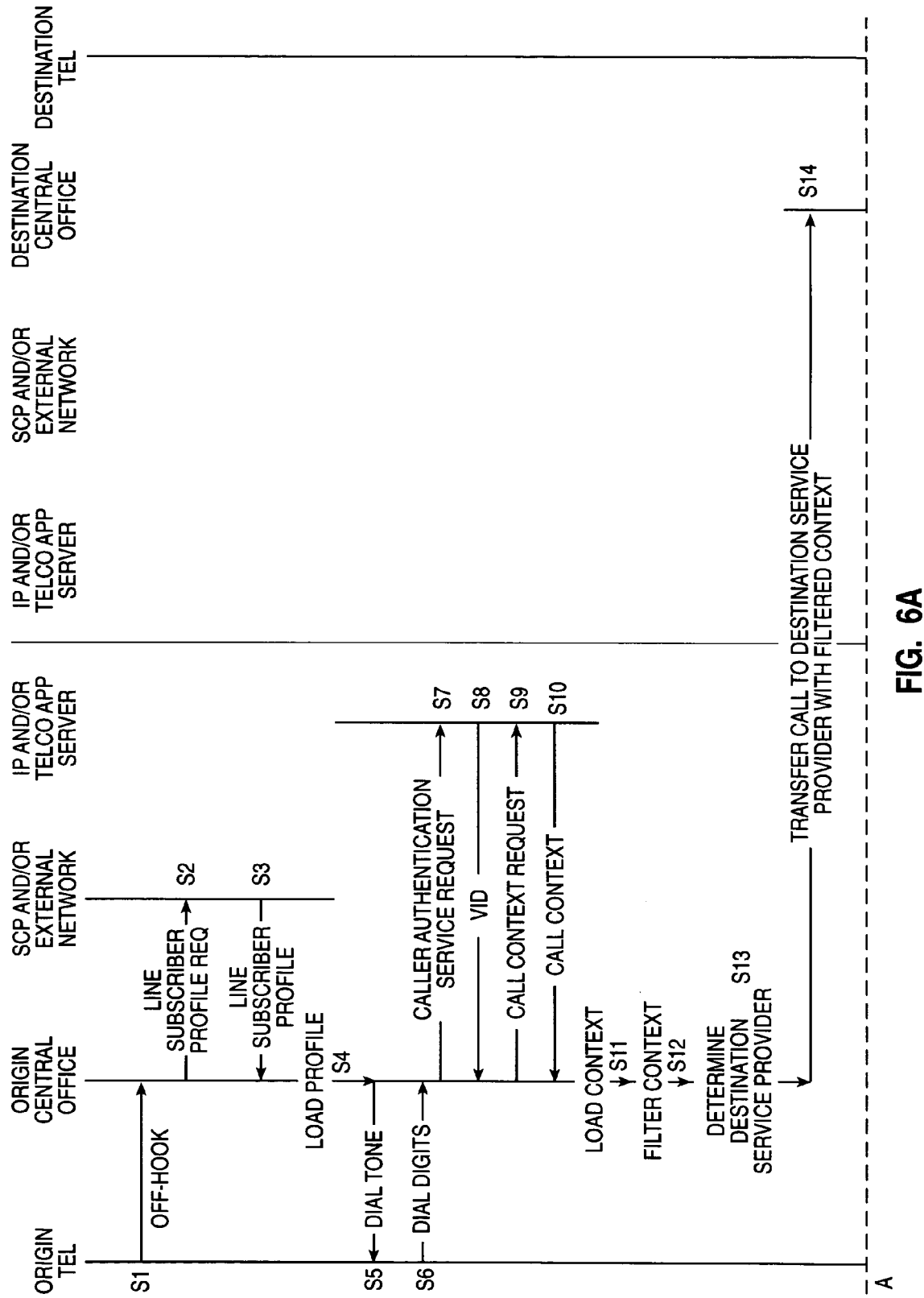
FIG. 6 illustrates a flow diagram of a signal flow and processing of a call in accordance with the method, system, and program of the present invention.
Figure 6B:
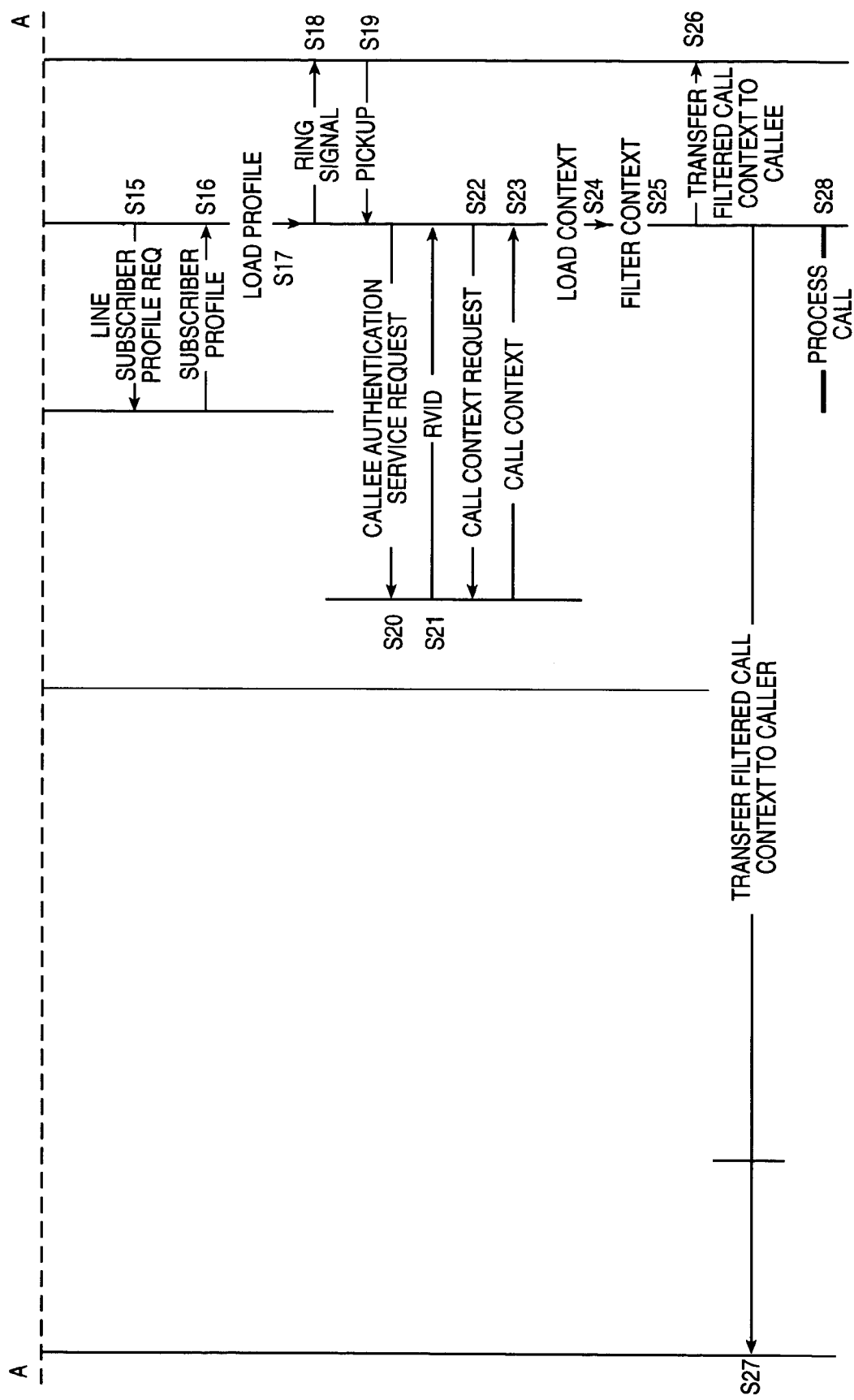

Referring now to FIG. 6, there is depicted a flow diagram of a signal flow and processing of a call in accordance with the method, system, and program of the present invention. A standard telephone device is assumed for the Atel@ origin device and destination device in the present example. However, a similar signal flow may be applied to other types of origin and destination devices, including server systems, private switching networks, and call centers. Further, the flow is described with reference to wireline devices, however is not limited in application to wireline devices.

The caller lifts a handset creating an off-hook state in the origin device and a corresponding change in state of an off-hook signal to the central office (step S1). In response to detecting an off-hook state in the origin device, the central office establishes a register for the call and requests a line subscriber profile from the SCP and/or an external network server (step S2). A line subscriber profile including preferred services and a billing plan is returned to the central office (step S3). The central office loads the line subscriber profile into the call register (step S4) and extends a dial tone to the origin device (step S5).

The origin device then transmits dialed digits to the central office (step S6). A caller may utilize a keypad to enter a telephone number or utilize a voice dial feature if available. Dialed digits may be received at other points in the process and loaded into the call register until needed for processing the call.

Next, the central office extends a caller authentication service request to an IP or to the telco application server (step S7). The caller authentication server will prompt a caller to provide a voice utterance, match the voice utterance with a voice template and authenticate the caller identity as a VID which is returned to the central office (step S8). Alternatively, the origin device or destination device may perform caller authentication, where the VID is received from the origin device or destination device.

Thereafter, the central office extends a call context request to a context inference service available from an IP or telco application server (step S9). The context inference service preferably accesses and loads a caller profile according to VID into the origin call register. Utilizing the line number, line subscriber profile, VID and caller profile, the context inference service preferably determines a context for the call. The call context is returned to the origin central office (step S10).

Next, the context is loaded into the call register (step S11). In addition, the context is filtered according to filtering factors (step S12). In particular, an IP or telco application server provide filtering service.

A destination service provider for the call according to the dialed digits is determined from a directory (step S13). Next, the call is transferred to the destination service provider with filtered context (step S14).

Upon receiving a call at a destination service provider central office, a call register is established for the call and the line subscriber profile request is initiated to a SCP or external network database (step S15). The line subscriber profile is returned to the central office (step S16) and loaded into the call register (step S17).

Next, a ring signal is extended to the destination device (step S18). If the call is answered, a pickup signal is returned to the destination central office (step S19). In response to detecting the pickup, a call authentication service request is initiated (step S20). The identity of the callee is preferably authenticated by an IP or telco application server and returned as a RVID to the destination central office (step S21).

Thereafter, the destination central office extends a call context request to the context inference service at an IP or telco application server to further determine the context of the call (step S22). The context inference service preferably determines context for the call from the recipient side of the call. In addition, the context inference service may determine context from the call in view of both the origination and reception sides of the call. The call context is preferably returned to the destination central office (step S23) and loaded into the call register (step S24). In addition, the context is preferably filtered for receipt by the caller and the callee (step S25).

The filtered call context is preferably transmitted via the signal channel to the destination device (step 26). In particular, the call context is preferably filtered for the callee to indicate the caller and the context of the caller's call request. While in the present example, call context information is transmitted to the destination device after determining call context for the callee, in alternate embodiments, call context may be transmitted to the callee at different points during the call as context is available. For example, the VID and device identity may be transmitted with a ring signal to the destination device, such that the callee is informed of who is calling and what device is calling before answering. In addition, complete context information may be transmitted after the call context for both sides of the call has been determined. Moreover, during a call, call context may continue to be inferred and transmitted to the destination device, such as a changing location of the caller.

The filtered call context is also preferably transmitted via the signal channel back to the origin device (step S27). In particular, the call context is preferably filtered for the caller to indicate the callee and the context of the callee answering the call. While in the present invention the RVID is transmitted as part of the filtered call context, in alternate embodiments the RVID may be transferred after determined.

As an alternative to initiating the context inference service from both the origin central office and the destination central office, only the destination central office may initiate the context inference service for determining a call context based on all the profile and identity information collected at the origin central office and destination central office.

The call is then processed to facilitate communications between the origin device and a destination device accessed in association with the dialed digits (step S28). In particular, processing the call also includes monitoring the call to determine additional call context for storage in association with the call and context updates provided to the caller and callee.

Figure 7:
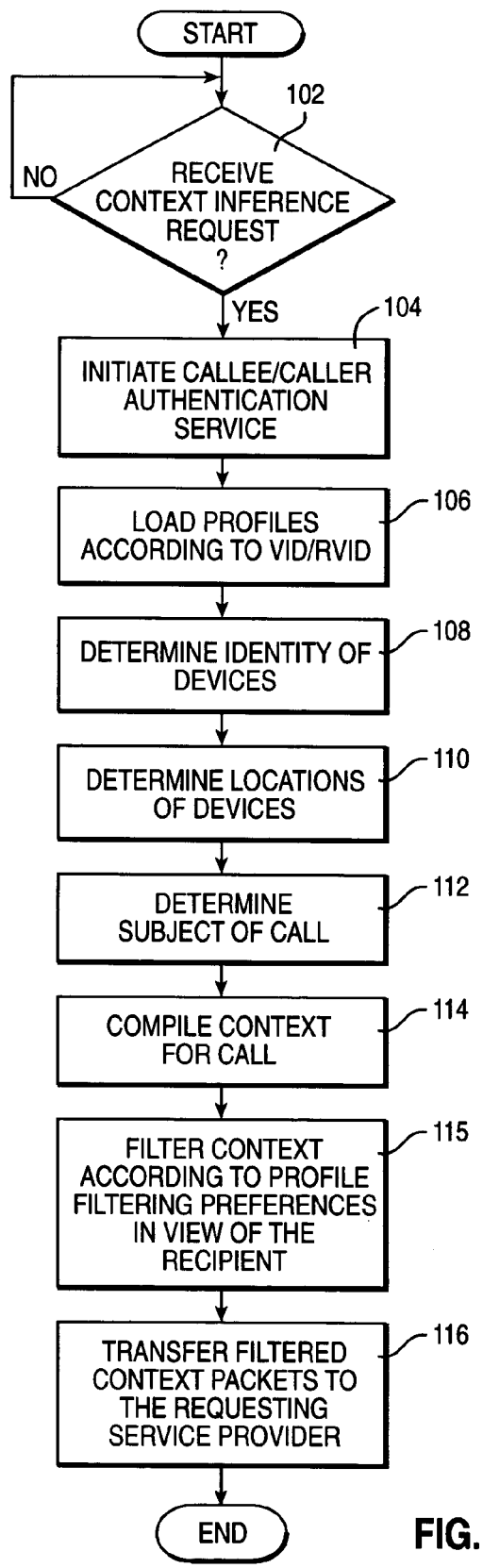
FIG. 7 depicts a high level logic flowchart of a process and program for determining call context in accordance with the present invention.

With reference now to FIG. 7, there is illustrated a high level logic flowchart of a process and program for determining call context in accordance with the present invention. As depicted, the process starts at block 100 and thereafter proceeds to block 102. Block 102 illustrates a determination as to whether a call context request is received. If a call context request is not received, then the process iterates at block 102. If call context request is received, then the process passes to block 104. A call context request may also include line subscriber profile information and other call information already loaded by the requesting service provider.

Block 104 depicts initiating a caller/callee identity authentication service. Next, block 106 illustrates loading profiles according to the VID/RVID authenticated for the caller/callee. Alternatively, VID/RVID for the call may be transferred with the call context request.

Next, block 108 illustrates determining the identity of any devices utilized in the call. Where a server enables a call from an individual telephone device, the identities of the individual telephone device and the server are preferably determined. Device identity may be determined from the line subscriber identity, a device identity output by the device, the type of service subscribed to for the device, and other available profile information.

Block 110 depicts determining the locations of any devices utilized in the call. Location may be precisely detected from a GPS coordinate. Alternatively, location may be inferred within a general area according to the geographical area covered by an office switch or a wireless tower originating or terminating the call. Further, location may be determined by the physical address assigned to a line number.

Block 112 illustrates determining the subject matter of a call. Subject matter may be inferred, for example, from services subscribed to by the caller/callee, from previous subject matter of calls between the parties, from the location of the calling party, or from the device identities. In addition, a party to a call may be prompted to indicate the subject matter of a call.

Thereafter, block 114 depicts compiling the context information for a call. In compiling context information, the information utilized to determine context is preferably consolidated into general context categories. In addition, block 115 illustrates filtering the context information for a call according to caller and callee profile preferences. Next, block 116 illustrates transferring the call context to the requesting service provider, and the process ends.

Figure 8:
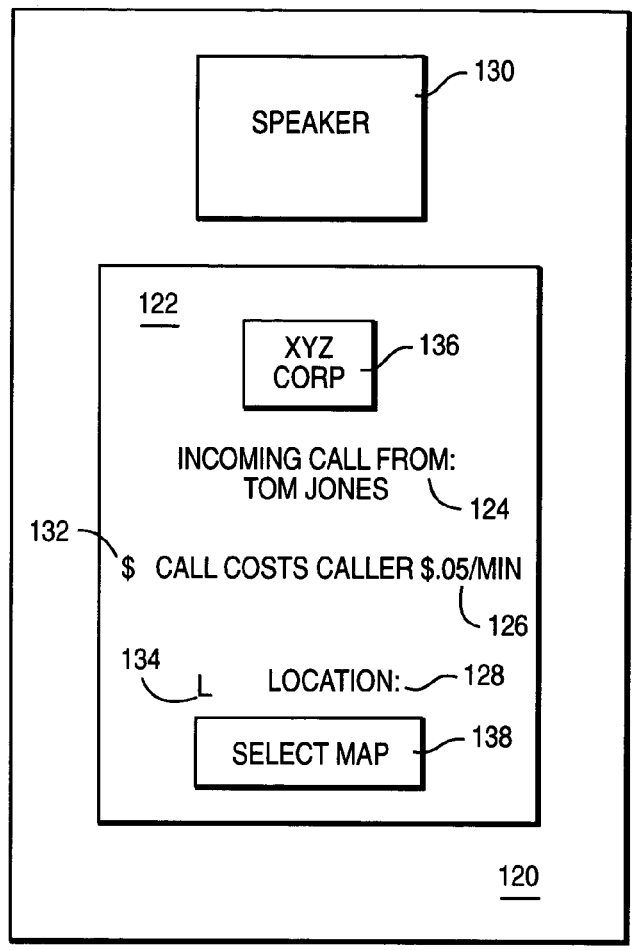
FIG. 8 illustrates an illustrative embodiment of a tagged VID output at a telephony device in accordance with the method, system, and program of the present invention.

Referring now to FIG. 8, there is an illustrative embodiment of a tagged VID output at a telephony device in accordance with the method, system, and program of the present invention. As illustrated, a telephony device 120 includes a graphical user interface 124 and a speaker 130. While in the present invention graphical user interface 124 and speaker 130 are depicted as integrated within telephony device 120, in alternate embodiments graphical user interface 124 and speaker 130 may be devices externally accessible to telephony device 120 via a wireline connection a or wireless network connection. In addition, graphical user interface 124 may be part of a stand-alone unit accessible to telephony device 120.

In the example, the following tagged VID is received at telephony device 120:

[caller name] Tom Jones, XYZ Corp Sales

[caller graphic] icon.gif

[caller sound] announce.sound

[billing] $0.05/minute billed to caller

[location] 205 Hampton Street, Austin, Tex. 78706

Advantageously, telephony device 120 controls output of the tagged VID according to the output capabilities of graphical user interface 124 and speaker 130. In the example, the caller name, billing information, and location are output as text entries 124, 126, and 128 via graphical user interface 122. Telephony device 120 may apply a text style to the entries and/or each tagged entry may include a preferred text style. In addition, as depicted, telephony device 120 may add addition graphical and textual indicators to graphically distinguish entries. Here, graphical indicators 132 and 134 are icons that a user will quickly learn to associate with billing and location context.

In addition to textual entries, the VID includes a graphic. Here, graphical user interface 124 is enabled to display graphics, so graphical icon 136 received as Aicon.gif@ is displayed with the caller name. Advantageously, allowing a caller identity to include graphics provides a kind of digital letterhead introduction for a caller. Other types of promotions, advertising, specification, and business information may also be included in a graphical attachment.

Further, the VID includes a sound clip. Here, speaker 130 is enabled to handle output of sound clips, so the sound clip received as Aannounce.sound@ is output. A sound clip may include the caller voice utterance utilized to authenticate the caller identity, a prerecorded sound clip of the caller introducing himself/herself, or a prerecorded sound clip of a generic or specified business introduction. A caller may have one prerecorded sound clip that introduces the caller to new customers and other prerecorded sound clip that introduces the caller to current customers.

According to another advantage of the present invention, telephony device 120 may enable location searches. Here, a user may select selectable icon 138 to view a map indicating the location provided in the VID location tag. Here, the VID location tag includes a street address, allowing the map to display a specific street address for the call origination. However, where only a city or other geographical area are specified in the location, the map may only show such an area. While examples of a graphic and sound file attached in a VID are provided, in alternate embodiments, alternate types of files may be attached in a VID, including a video file.

It should be noted that while this example is described with reference to a VID, a telephony device may also control display of an RVID and may include a specified selection of graphical identifiers and capabilities for output of an RVID. Further, a device owner may program the telephony device with certain preferences for VID and RVID output. Moreover, a VID or RVID may include such preferences as filtered by the context inference engine according to caller and callee profiles.

Figure 9:
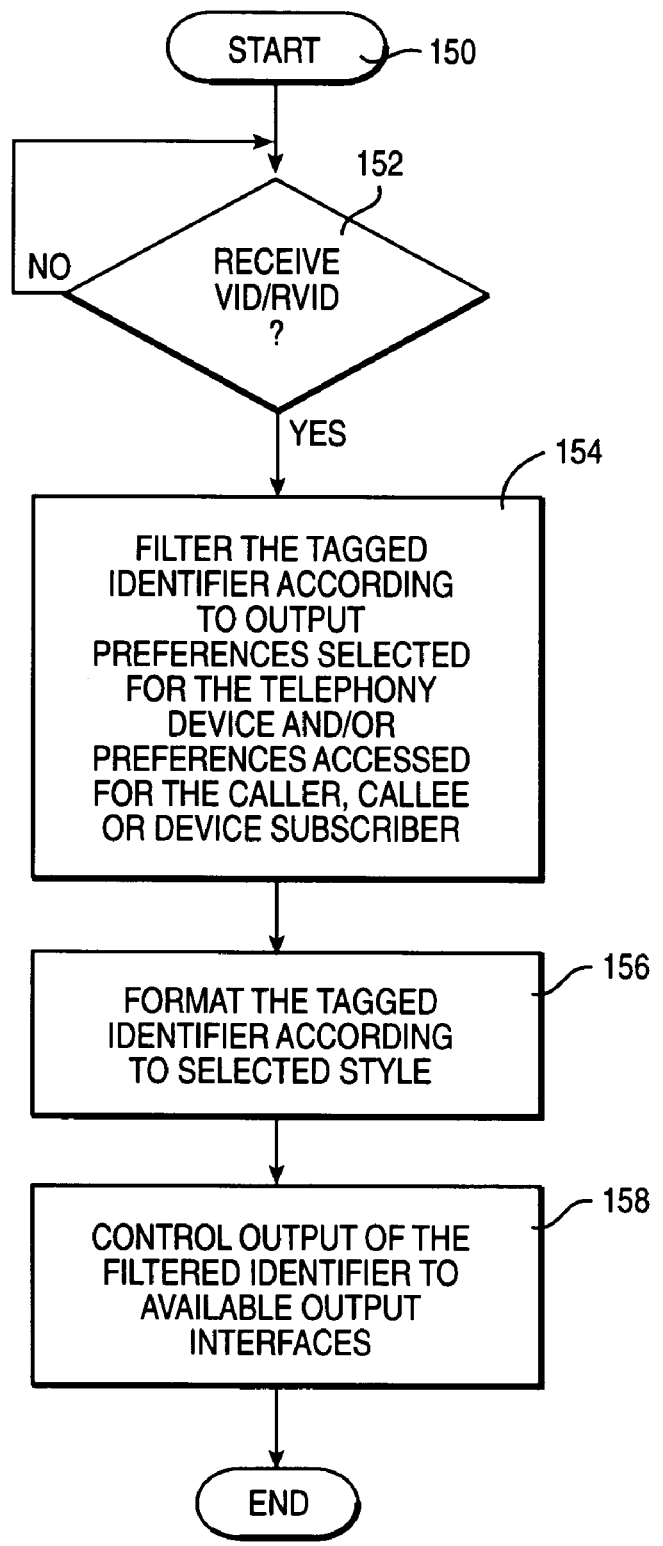
FIG. 9 depicts a high level logic flowchart of a process and program for controlling output of a VID or RVID at a telephony device.

Referring now to FIG. 9, there is illustrated a high level logic flowchart of a process and program for controlling output of a VID or RVID at a telephony device. As depicted, the process starts at block 150 and thereafter proceeds to block 152. Block 152 illustrates a determination as to whether a VID/RVID is received. If a VID/RVID is not received, then the process iterates at block 152. When a VID/RVID is received, then the process passes to block 154.

Block 154 depicts filtering the tagged VID/RVID according to output preferences set at the telephony device. For example, a preference may indicate only displaying a caller name when the telephony device is not already enabling another call, but displaying the caller name and all other context information provided if the telephony device is already enabling another call. Other preferences may be specified for particular VIDs/RVIDs, for particular times of day, for particular billing plans, and other selectable by a caller, callee or line subscriber to a telephony device.

Next, block 156 illustrates formatting the tagged VID/RVID according to the output format of the telephony device. For example, the telephony device may utilize particular font styles, icons, graphics, video and sound to format output of a tagged VID/RVID.

Thereafter, block 158 depicts controlling output of the formated VID/RVID to the available interfaces, and the process ends. In particular, output interfaces may include a graphical user interface, a tactile sensitive interface, a speaker or other audio output controller, and other types of interfaces accessible to the telephony device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for identifying a context for a call, said method comprising:
   detecting a plurality of context clues for a call; and
   identifying a context for said call from said plurality of context clues, such that at least one party to said call is enabled to receive said context of said call.

2. The method for identifying a context for a call according to claim 1, wherein detecting a plurality of context clues further comprises:
   detecting at least one from among an authenticated identity of a caller of said call and an authenticated identity of a callee of said call.

3. The method for identifying a context for a call according to claim 1, wherein detecting a plurality of context clues further comprises:
   detecting at least one from among an identity of an origin device and an identity of a destination device.

4. The method for identifying a context for a call according to claim 1, wherein detecting a plurality of context clues further comprises:
   detecting at least one from among a location said call originates and a location said call terminates.

5. The method for identifying a context for a call according to claim 4, wherein said location may comprise at least one from among a time zone, a country, a state, a city, a GPS location, and a building location.

6. The method for identifying a context for a call according to claim 4, further comprising:
   detecting said location according to a geographical service area of at least one network system providing service to said call.

7. The method for identifying a context for a call according to claim 1, wherein detecting a plurality of context clues further comprises:
   detecting a subject matter of said call.

8. The method for identifying a context for a call according to claim 7, further comprising:
   retrieving at least one subject of a previous call of at least one party to said call; and
   prompting said at least one party to said call to select said from said at least one subject of said previous call.

9. The method for identifying a context for a call according to claim 1, wherein detecting a plurality of context clues further comprises:
   detecting a path of said call to a plurality of line numbers.

10. The method for identifying a context for a call according to claim 1, wherein identifying a context for said call further comprises:
    identifying said context for said call at a service server operating outside a trusted telephone network.

11. The method for identifying a context for a call according to claim 1, wherein identifying a context for said call further comprises:
    identifying said context for said call at an intelligent peripheral service operating inside a trusted telephone network.

12. The method for identifying a context for a call according to claim 1, further comprising:
    accessing filtering preferences for at least one party to said call; and
    filtering said context for said call distributed to at least one other party to said call according to said filtering preferences.

13. The method for identifying a context for a call according to claim 12, further comprising:
    filtering an identifier for said at least one party to said call according to a relationship of said at least one party to said call with said at least one other party to said call.

14. The method for identifying a context for a call according to claim 12, further comprising:
    filtering said context for said call according to said filtering preferences for distribution to a second caller of a second call incoming during said call.

15. The method for identifying a context for a call according to claim 1, wherein identifying a context for a call further comprises:
    identifying that said call is forwarded to another line number.

16. A system for identifying a context for a call, said system comprising:
    a context inference server communicatively connected to a trusted telephone network;
    means for detecting a plurality of context clues for a call at said context inference server; and
    means for identifying a context for said call from said plurality of context clues, such that at least one party to said call is enabled to receive said context of said call.

17. The system for identifying a context for a call according to claim 16, wherein said means for detecting a plurality of context clues further comprises:
    means for detecting at least one from among an authenticated identity of a caller of said call and an authenticated identity of a callee of said call.

18. The system for identifying a context for a call according to claim 16, wherein said means for detecting a plurality of context clues further comprises:
    means for detecting at least one from among an identity of an origin device and an identity of a destination device.

19. The system for identifying a context for a call according to claim 16, wherein said means for detecting a plurality of context clues further comprises:
    means for detecting at least one from among a location said call originates and a location said call terminates.

20. The system for identifying a context for a call according to claim 19, wherein said location may comprise at least one from among a time zone, a country, a state, a city, a GPS location, and a building location.

21. The system for identifying a context for a call according to claim 19, further comprising:
    means for detecting said location according to a geographical service area of at least one network system providing service to said call.

22. The system for identifying a context for a call according to claim 16, wherein said means for detecting a plurality of context clues further comprises:
    means for detecting a subject matter of said call.

23. The system for identifying a context for a call according to claim 22, further comprising:
    means for retrieving at least one subject of a previous call of at least one party to said call; and
    means for prompting said at least one party to said call to select said from said at least one subject of said previous call.

24. The system for identifying a context for a call according to claim 16, wherein said means for detecting a plurality of context clues further comprises:
    means for detecting a path of said call to a plurality of line numbers.

25. The system for identifying a context for a call according to claim 16, wherein said context inference server is communicatively connected to said trusted telephone network through a network external to said trusted telephone network.

26. The system for identifying a context for a call according to claim 16, wherein said context inference service is communicatively connected within said trusted telephone network.

27. The system for identifying a context for a call according to claim 16, further comprising:
means for accessing filtering preferences for at least one party to said call; and
means for filtering said context for said call distributed to at least one other party to said call according to said filtering preferences.

28. The system for identifying a context for a call according to claim 27, further comprising:
means for filtering an identifier for said at least one party to said call according to a relationship of said at least one party to said call with said at least one other party to said call.

29. The system for identifying a context for a call according to claim 27, further comprising:
means for filtering said context for said call according to said filtering preferences for distribution to a second caller of a second call incoming during said call.

30. The system for identifying a context for a call according to claim 16, wherein said means for identifying a context for a call further comprises:
means for identifying that said call is forwarded to another line number.

31. A computer program product for identifying a context for a call, said computer program product comprising:
a recording medium;
means, recorded on said recording medium, for enabling detection of a plurality of context clues for a call; and
means, recorded on said recording medium, for identifying a context for said call from said plurality of context clues, such that at least one party to said call is enabled to receive said context of said call.

32. The computer program product for identifying a context for a call according to claim 31, further comprising:
means, recorded on said recording medium, for enabling detection of at least one from among an authenticated identity of a caller of said call and an authenticated identity of a callee of said call.

33. The computer program product for identifying a context for a call according to claim 31, further comprising:
means, recorded on said recording medium, for enabling detection of at least one from among an identity of an origin device and an identity of a destination device.

34. The computer program product for identifying a context for a call according to claim 31, further comprising:
means, recorded on said recording medium, for enabling detection of at least one from among a location said call originates and a location said call terminates.

35. The computer program product for identifying a context for a call according to claim 34, further comprising:
means, recorded on said recording medium, for enabling detection of said location according to a geographical service area of at least one network system providing service to said call.

36. The computer program product for identifying a context for a call according to claim 31, further comprising:
means, recorded on said recording medium, for enabling detection of a subject matter of said call.

37. The computer program product for identifying a context for a call according to claim 36, further comprising:
means, recorded on said recording medium, for controlling retrieval of at least one subject of a previous call of at least one party to said call; and
means, recorded on said recording medium, for prompting said at least one party to said call to select said from said at least one subject of said previous call.

38. The computer program product for identifying a context for a call according to claim 31, further comprising:
means, recorded on said recording medium, for enabling detection of a path of said call to a plurality of line numbers.

39. The computer program product for identifying a context for a call according to claim 31, further comprising:
means, recorded on said recording medium, for accessing filtering preferences for at least one party to said call; and
means, recorded on said recording medium, for filtering said context for said call distributed to at least one other party to said call according to said filtering preferences.

40. The computer program product for identifying a context for a call according to claim 39, further comprising:
means, recorded on said recording medium, for filtering an identifier for said at least one party to said call according to a relationship of said at least one party to said call with said at least one other party to said call.

41. The computer program product for identifying a context for a call according to claim 39, further comprising:
means, recorded on said recording medium, for filtering said context for said call according to said filtering preferences for distribution to a second caller of a second call incoming during said call.

42. The computer program product for identifying a context for a call according to claim 31, further comprising:
means, recorded on said recording medium, for identifying that said call is forwarded to another line number.

43. A method for inferring a call context comprising:
receiving a context request for a call;
detecting context clues comprising at least one from among a line number, a line subscriber profile, an authenticated caller identity, an authenticated callee identity, a caller profile associated with said authenticated caller identity, a callee profile associated with said authenticated callee identity, a line number accessed for said call, and a geographical location served by switches processing said call; and
inferring from said context clues at least one from among who is placing said call, who is receiving said call, at least one device utilized for said call, a location of said at least one device utilized for said call, a billing plan for said call, a path of said call, and a subject matter of said call.

44. A system for inferring a call context comprising:
a context inference server communicatively connected to a trusted telephone network;
means for receiving a context request for a call at said context inference server;
means for detecting context clues comprising at least one from among a line number, a line subscriber profile, an authenticated caller identity, an authenticated callee identity, a caller profile associated with said authenticated caller identity, a callee profile associated with said authenticated callee identity, a line number accessed for said call, and a geographical location served by switches processing said call; and
means for inferring from said context clues at least one from among who is placing said call, who is receiving said call, at least one device utilized for said call, a location of said at least one device utilized for said call, a billing plan for said call, a path of said call, and a subject matter of said call.

45. A computer program product for inferring a call context comprising:
a recording medium;
means for enabling receipt of a context request for a call;
means for detecting context clues comprising at least one from among a line number, a line subscriber profile, an authenticated caller identity, an authenticated callee identity, a caller profile associated with said authenticated caller identity, a callee profile associated with said authenticated callee identity, a line number accessed for said call, and a geographical location server by switches processing said call; and
means for inferring from said context clues at least one from among who is placing said call, who is receiving said call, at least one device utilized for said call, a location of said at least one device utilized for said call, a billing plan for said call, a path of said call, and a subject matter of said call.

46. A method for providing a call context comprising:
detecting a call request at a central office switch;
initiating a context inference service for said call; and
receiving a context inferred for said call from at least one from among an identity of at least one party to said call, an identity of at least one device utilized for said call, a location of said at least one device, a billing plan for said call, a path of said call, and a subject matter of said call.

47. The method for providing a call context according to claim 46, wherein said context inference service is located within an intelligent peripheral accessible within a trusted telephone network comprising said central office switch.

48. The method for providing a call context according to claim 46, wherein said call context inference service is located in a server system accessible via a secure network channel outside a trusted telephone network comprising said central office switch.

49. The method for providing a call context according to claim 46, further comprising:
transferring said context inferred for said call to an origin device utilized to originate said call.

50. The method for providing a call context according to claim 46, further comprising:
transferring said context inferred for said call to a destination device utilized to answer said call.

51. A system for providing a call context comprising:
a central office switch within a trusted telephone network;
means for detecting a call request at said central office switch;
means for initiating a context inference service for said call; and
means for receiving a context inferred for said call from at least one from among an identity of at least one party to said call, an identity of at least one device utilized for said call, a location of said at least one device, a billing plan for said call, a path of said call, and a subject matter of said call.

52. The system for providing a call context according to claim 51, wherein said context inference service is located within an intelligent peripheral accessible within said trusted telephone network.

53. The system for providing a call context according to claim 51, wherein said call context inference service is located in a server system accessible via a secure network channel outside said trusted telephone network.

54. The system for providing a call context according to claim 51, further comprising:
means for transferring said context inferred for said call to an origin device utilized to originate said call.

55. The system for providing a call context according to claim 51, further comprising:
means for transferring said context inferred for said call to a destination device utilized to answer said call.

56. A computer program product for providing a call context comprising:
a recording medium;
means, recorded on said recording medium, for detecting a call request;
means, recorded on said recording medium, for initiating a context inference service for said call; and
means, recorded on said recording medium, for receiving a context inferred for said call from at least one from among an identity of at least one party to said call, an identity of at least one device utilized for said call, a location of said at least one device, a billing plan for said call, a path of said call, and a subject matter of said call.

57. The computer program product for providing a call context according to claim 56, further comprising:
means, recorded on said recording medium, for transferring said context inferred for said call to an origin device utilized to originate said call.

58. The computer program product for providing a call context according to claim 56, further comprising:
means, recorded on said recording medium, for transferring said context inferred for said call to a destination device utilized to answer said call.

59. A method for controlling output of a call context, comprising:
receiving, in association with a call enabled by a telephony device, a tagged call context identifier at said telephony device; and
controlling output of said tagged call context identifier via at least one output interface accessible to said telephony device.

60. The method for controlling output of a call context according to claim 59, wherein said tagged call context identifier is a tagged voice identifier.

61. The method far controlling output of a call context according to claim 59, wherein said tagged call context identifier is a tagged reverse voice identifier.

62. The method for controlling output of a call context according to claim 59, wherein said tagged call context identifier comprises at least one from among, an identifier of a party to said call, a graphic identifier, a sound identifier, a video identifier, a location of a party to said call, a path of line numbers accessed for said call, a billing context for said call, and a subject matter of said call.

63. The method for controlling output of a call context according to claim 59, wherein said at least one output interface comprises at least one from among a graphical user interface and a speaker.

64. The method for controlling output of a call context according to claim 59, wherein said at least one output interface is externally accessible to said telephony device.

65. The method for controlling output of a call context according to claim 59, wherein said at least one output interface is an integrated device within said telephony device.

66. The method for controlling output of a call context according to claim 59, further comprising:

filtering said tagged call context identifier according to output preferences selected at said telephony device.

67. The method for controlling output of a call context according to claim 59, further comprising:
formatting said tagged call context identifier according to formatting styles designated at said telephony device.

68. A system for controlling output of a call context, comprising:
a telephony device;
means for receiving, in association with a call enabled by said telephony device, a tagged call context identifier at said telephony device; and
means for controlling output of said tagged call context identifier via at least one output interface accessible to said telephony device.

69. The system for controlling output of a call context according to claim 68, wherein said tagged call context identifier is a tagged voice identifier.

70. The system for controlling output of a call context according to claim 68, wherein said tagged call context identifier is a tagged reverse voice identifier.

71. The system for controlling output of a call context according to claim 68, wherein said tagged call context identifier comprises at least one from among, an identifier of a party to said call, a graphic identifier, a sound identifier, a video identifier, a location of a party to said call, a path of line numbers accessed for said call, a billing context for said call, a path of said call, and a subject matter of said call.

72. The system for controlling output of a call context according to claim 68, wherein said at least one output interface comprises at least one from among a graphical user interface and a speaker.

73. The system for controlling output of a call context according to claim 68, wherein said at least one output interface is externally accessible to said telephony device.

74. The system for controlling output of a call context according to claim 68, wherein said at least one output interface is an integrated device within said telephony device.

75. The system for controlling output of a call context according to claim 68, further comprising:
means for filtering said tagged call context identifier according to output preferences selected at said telephony device.

76. The system for controlling output of a call context according to claim 68, further comprising:
means for formatting said tagged call context identifier according to formatting styles designated at said telephony device.

77. A computer program product fir controlling output of a call context, comprising:
a recording medium;
means, recorded on said recording medium, for receiving a tagged call context identifier at a telephony device; and
means, recorded on said recording medium, for controlling output of said tagged call context identifier via at least one output interface accessible to said telephony device.

78. The computer program product for controlling output of a call context according to claim 77, further comprising:
means, recorded on said recording medium, for filtering said tagged call context identifier according to output preferences selected at said telephony device.

79. The computer program product for controlling output of a call context according to claim 77, further comprising:
means, recorded on said recording medium, for formatting said tagged call context identifier according to formatting styles designated at said telephony device.

* * * * *